(12) United States Patent
Hill et al.

(10) Patent No.: US 8,358,498 B2
(45) Date of Patent: Jan. 22, 2013

(54) ELECTRICAL UNIT MOUNTING (75) Inventors: John Hill, Marysville, OH (US);
Michael Khanh Luong, Columbus, OH (US); Jason T. Wolf, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 12/895,256

(22) Filed: Sep. 30, 2010

(65) Prior Publication Data
US 2012/0081844 A1 Apr. 5, 2012

(51) Int. Cl.
*G06F 1/16* (2006.01)
(52) U.S. Cl. .................. 361/679.01; 359/377
(58) Field of Classification Search ............ 361/679.01
See application file for complete search history.

(56) References Cited

U.S. PATENT DOCUMENTS

| 4,875,273 A | 10/1989 | Yamamoto |
| 4,907,870 A * | 3/1990 | Brucker ........................ 359/875 |
| 5,709,358 A | 1/1998 | Kubota |
| 5,798,575 A * | 8/1998 | O'Farrell et al. ............ 307/10.1 |
| 5,971,461 A | 10/1999 | Vaishnav et al. |
| 6,217,181 B1 * | 4/2001 | Lynam et al. ................. 359/879 |
| 6,916,100 B2 * | 7/2005 | Pavao ........................... 359/841 |
| 7,003,881 B2 | 2/2006 | Galliani et al. |
| 7,035,678 B2 * | 4/2006 | Lynam et al. ............. 455/575.1 |
| 7,090,363 B1 * | 8/2006 | Boddy et al. .................. 359/872 |
| 7,287,867 B2 * | 10/2007 | Wellington et al. ........... 359/841 |
| 7,322,710 B2 * | 1/2008 | Foote et al. ................... 359/876 |
| 7,810,939 B2 * | 10/2010 | Foote ............................ 359/877 |
| 7,934,843 B2 * | 5/2011 | Lynam ......................... 359/866 |
| 2004/0240090 A1 * | 12/2004 | Skiver et al. ................. 359/872 |
| 2007/0183068 A1 * | 8/2007 | Kozlowski ................... 359/877 |
| 2011/0291874 A1 * | 12/2011 | De Mersseman .............. 342/70 |

* cited by examiner

*Primary Examiner* — Lisa Lea Edmonds
(74) *Attorney, Agent, or Firm* — Fay Sharpe LLP (57) ABSTRACT

A mounting assembly and method of mounting an electrical unit to an automotive dashboard includes providing an electrical unit and operatively engaging the electrical unit to a cover, either an undercover of the instrument panel, or a cowl lining area. Alignment pins provided in the cover cooperate with openings in mounting tabs of the electrical unit for positioning the electrical unit while fastener screws are subsequently installed to secure the unit to the cover.

20 Claims, 7 Drawing Sheets

ELECTRICAL UNIT MOUNTING

BACKGROUND

This disclosure relates to a mounting assembly and method for mounting an electrical unit, and particularly an electrical unit operatively associated with remote control of mirrors for automotive vehicles. More particularly, the disclosure finds particular application with regard to mounting the for an electric unit associated with side-view mirrors and remote control mirror switch used to adjust the mirrors via an actuating motor and control movement of the mirror about first and second perpendicular axes, although selected details of the mounting assembly and method may find application in related environments and applications.

A present method and apparatus for mounting an electrical unit positions a remote control mirror switch in a door. Recently, however, designers desire to move the switch to the instrument panel. As such, it has been proposed to mount (bolt) the electrical unit to a steering hanger beam or other metal structure, e.g., pedals, dashboard, etc. However, the bolts and metal housing add significant cost and weight to the arrangement.

Accordingly, a need exists for an arrangement for mounting an electrical unit that is located as close as possible to the remote control mirror switch, and in a manner that significantly reduces the vehicle cost and weight by allowing less expensive materials to be used to secure the electrical unit.

BRIEF DESCRIPTION

An electrical unit mounting assembly is secured to an automotive instrument panel. The mounting assembly includes an electrical unit and a cover configured for operative engagement. The electrical unit is mounted in the cover with at least one alignment member and at least one reusable threaded fastener.

In an exemplary embodiment, the electrical unit mounting assembly includes second and third reusable threaded fasteners disposed in spaced locations relative to one another.

An opening is preferably provided in the electrical unit to receive the alignment member, and the cover preferably includes at least one boss for receiving the at least one reusable threaded fastener.

At least one mounting tab extends from a perimeter portion of the electrical unit and includes an opening dimension to receive an alignment pin for properly orienting the electrical unit relative to the cover.

The electrical unit is preferably mounted adjacent a mirror switch located on the instrument panel.

In one exemplary embodiment, the cover that receives the electrical unit is an undercover that mounts to an instrument panel of the automotive vehicle, while in another embodiment, the cover is a side cowl lining area.

A method of mounting the electrical unit includes providing a non-metallic housing that receives the memory board. Positioning the opening defined in the mounting tab relative to an alignment pin initially orients the housing. Installing a screw through the mounting tab into a boss in the automotive vehicle secures the electrical unit.

A primary benefit is the reduced cost associated with this mounting arrangement.

Still another benefit is associated with the reduced weight of the mounting unit.

Yet another advantage resides in the ability to mount the electrical unit as close as possible to the remote control mirror switch.

Another advantage is associated with the reduced weight as a result of using a plastic housing instead of a metal housing.

Still other benefits and advantages of the present disclosure will become more apparent from reading and understanding the following detailed description.

DETAILED DESCRIPTION

Figure 1:
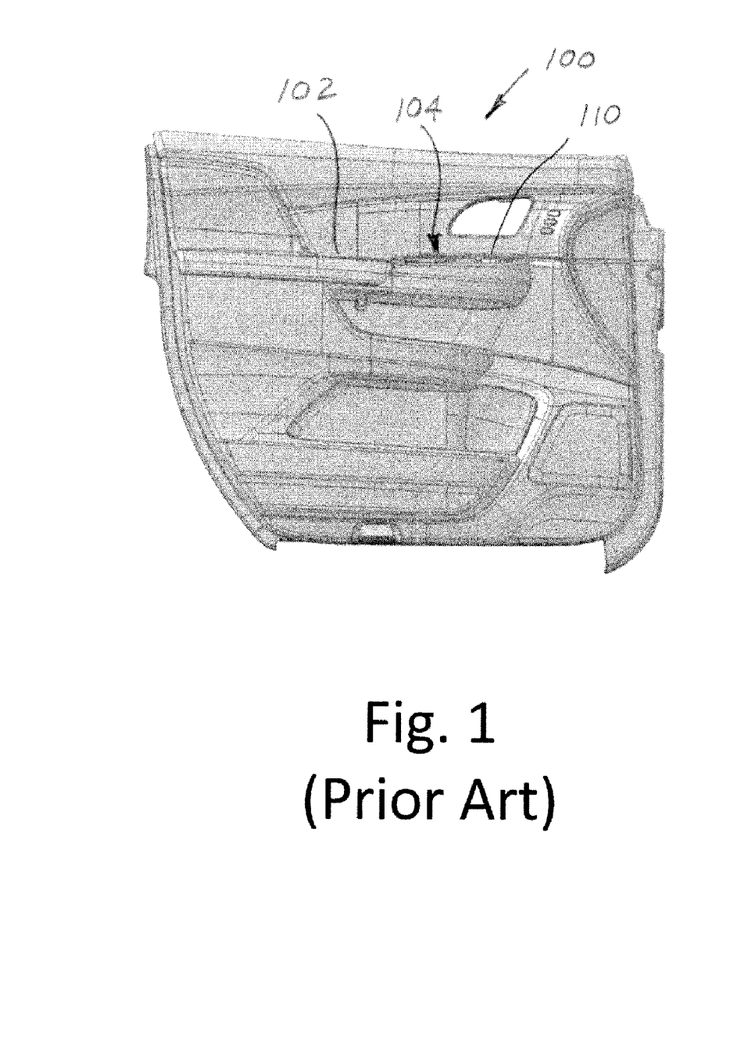
FIGS. 1 and 2 are plan views of a door showing a conventional location of a remote control mirror switch.
Figure 2:
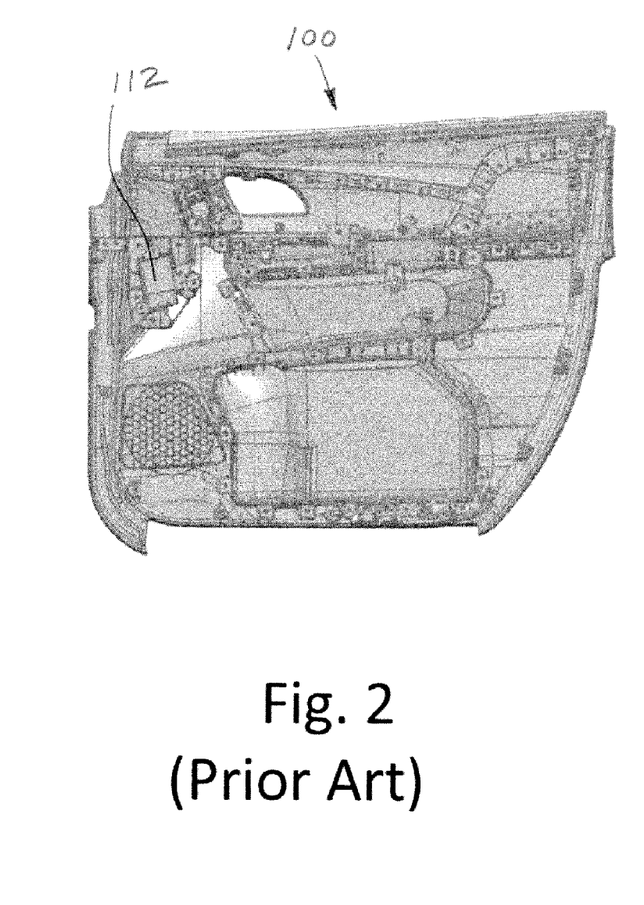

FIGS. 1 and 2 are prior art illustrations of a door panel, and particularly show front and rear surfaces of a driver front door lining 100. Details of the front door lining are generally well known in the art so that further discussion of the entire structure is deemed unnecessary. More particularly, an armrest region 102 of the door lining 100 extends inwardly into an interior compartment of the vehicle and preferably has a driver control region 104 that includes various controls or switches for automotive vehicle operations such as power windows, power locks, and more specifically a remote control mirror switch 110. The remote control mirror switch 110 is operatively associated with an electrical unit 112 operatively associated with side-view mirrors (not shown). As is known in the art, the electrical unit 112 is typically a metal housing that encloses a printed circuit member or memory board so that operation of the remote control mirror switch 110 allows the driver to unlock the mirror and remotely actuate movement of one of the side-view mirrors (i.e., up/down and side/side) by selectively actuating the switch or switch portions 110. Suitable signals are sent to a mirror actuator motor (not shown) to control movement of the side-view mirrors in the desired direction. Once the mirror(s) has been adjusted as desired, the unit is locked to maintain the mirror in the desired position. Although not illustrated, it is understood that an electrical cable interconnects the remote control mirror switch 110 with the electrical unit 112, typically through the rear surface (FIG. 2) of the driver front door lining, and likewise electrical cables extend from from the electrical unit 112 to the respective mirror actuator motors.

Figure 3:
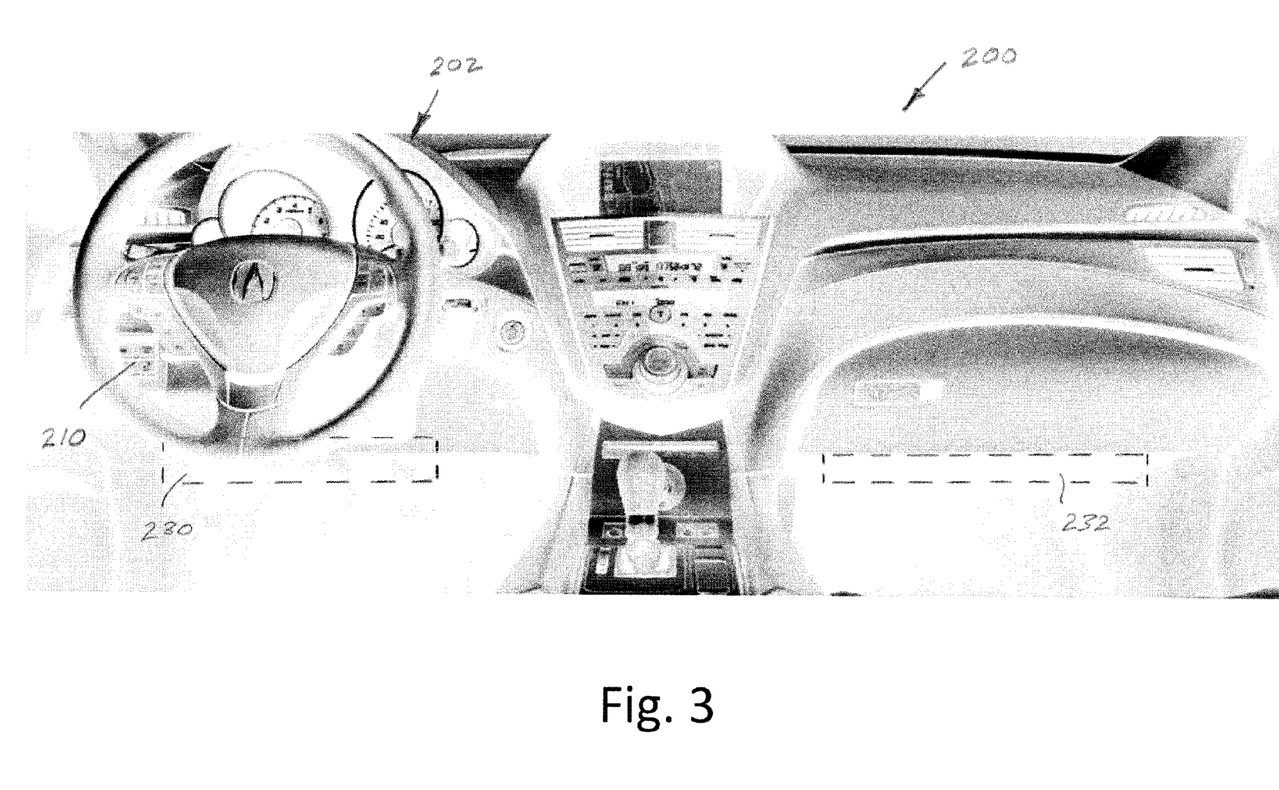
FIG. 3 shows a dashboard/instrument panel of an automotive vehicle.
Figure 4:
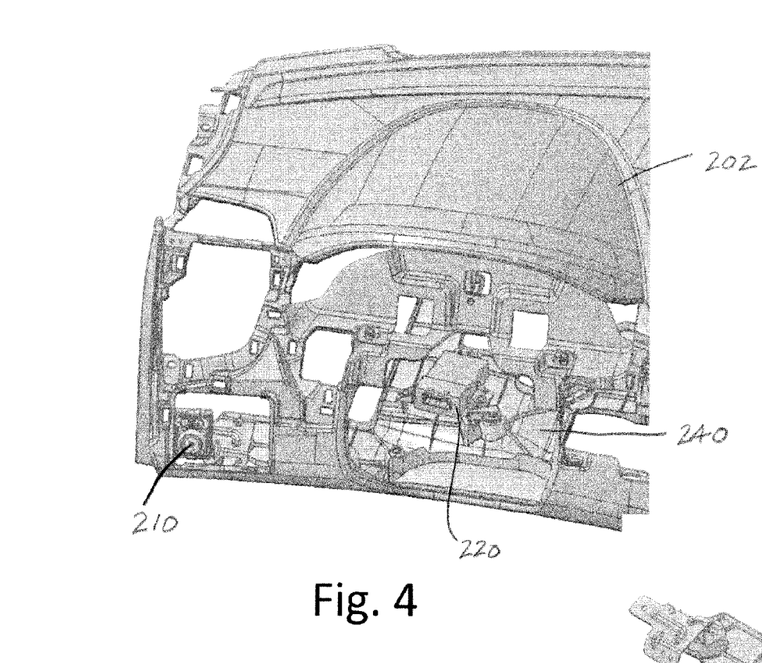
FIG. 4 is a perspective view of the instrument panel with selected portions removed for ease of illustration.
Figure 5:
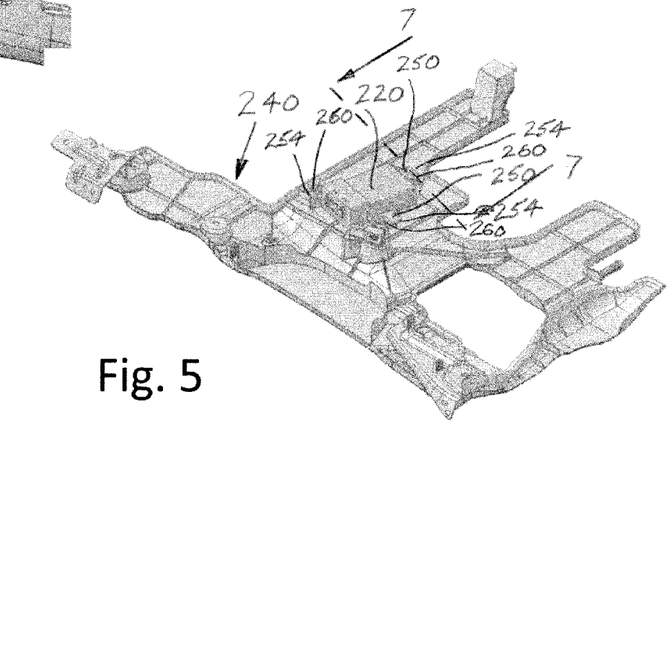
FIG. 5 is a perspective view of the undercover.
Figure 6:
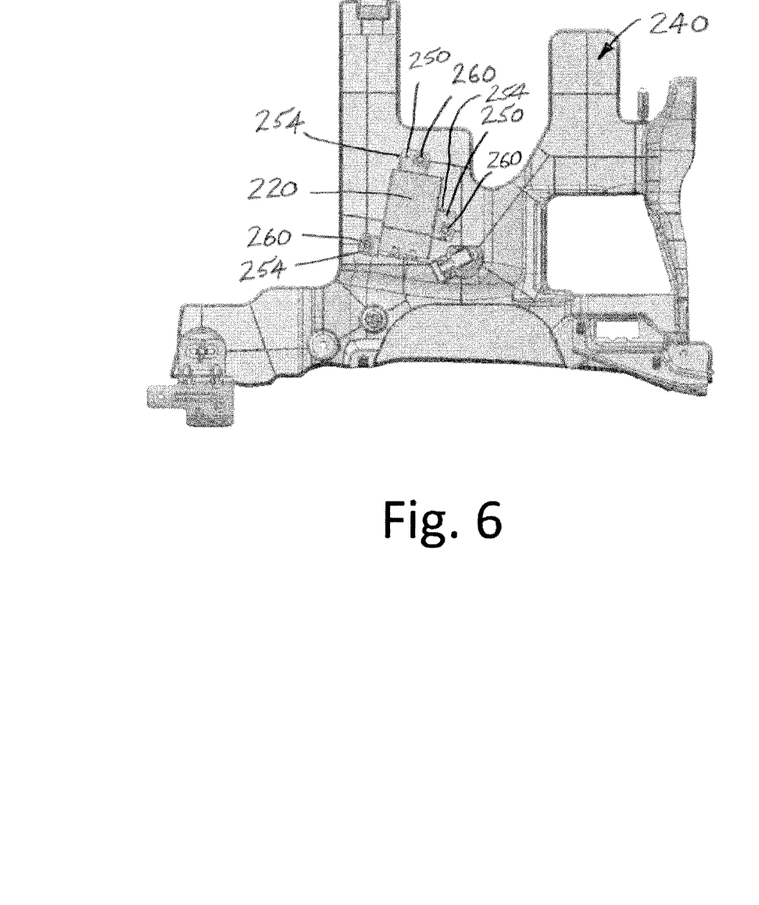
FIG. 6 is a plan view of the undercover of FIG. 5.

Turning to FIG. 3, dashboard 200 includes an instrument panel 202 shown here on a left-hand side of the vehicle, and for purposes of the following description, may be more generically described as the driver side of the vehicle. A remote control mirror switch 210 is located in the instrument panel 202, shown here at a lower left-hand region of the instrument panel. Again, operation of the switch or switch portions 210 locks/unlocks, and adjusts the position of the side-view mirrors in a generally conventional manner. Locating the mirror switch 210 on the instrument panel requires a new location for the electrical unit and a secure mounting arrangement therefor. Bolting the electrical unit to a steering hanger beam or other metal structure is not deemed desirable. However, a location of the electrical unit 220 (FIGS. 4-7) as close as possible to the remote control mirror switch 210 is desired.

Figure 7:
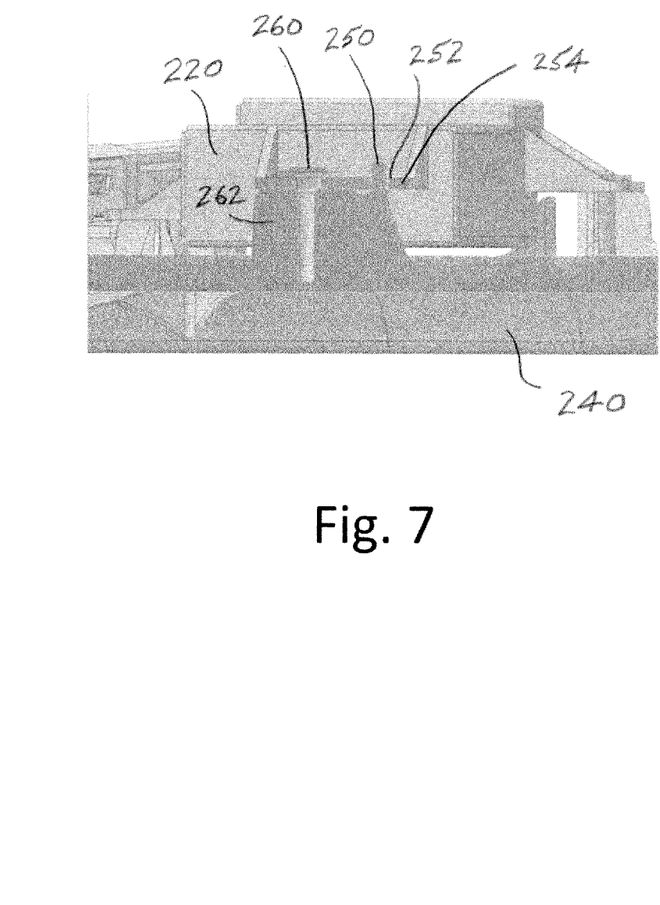
FIG. 7 is an enlarged view taken generally along the lines 7-7-of FIG. 5.
Figure 8:
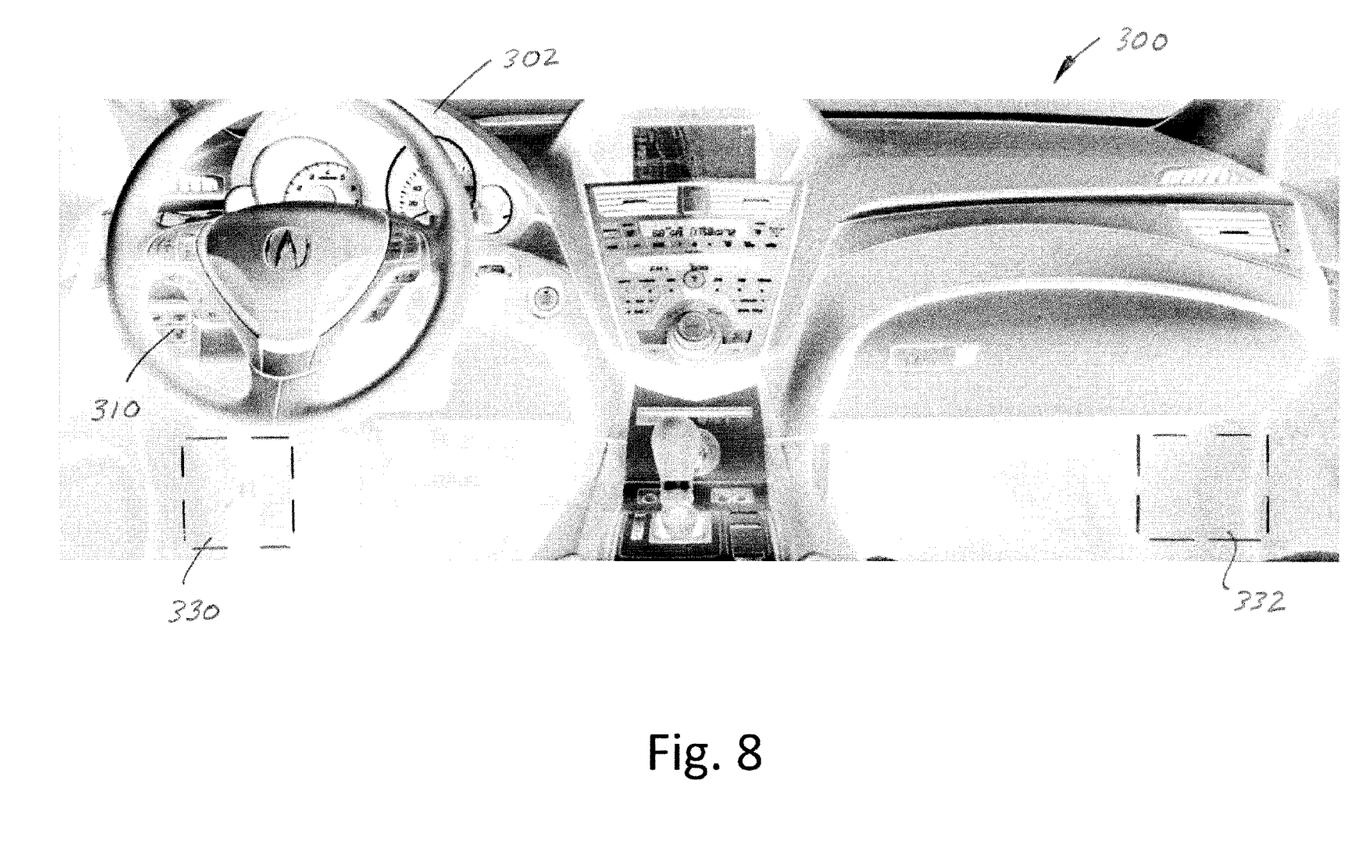
FIG. 8 is a view similar to FIG. 3 and illustrating an alternative mounting location.
Figure 9:
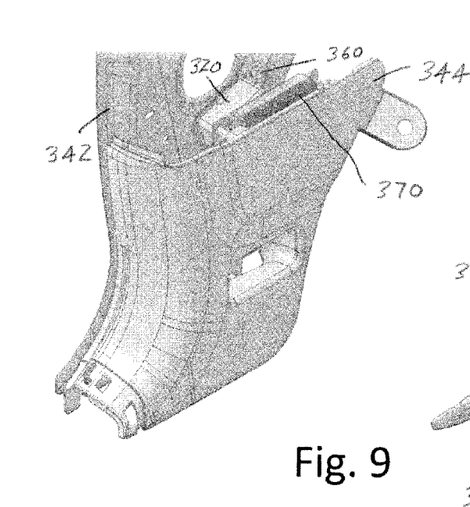
FIG. 9 is a perspective view of the cowl lining area on the driver side of the vehicle.
Figure 10:
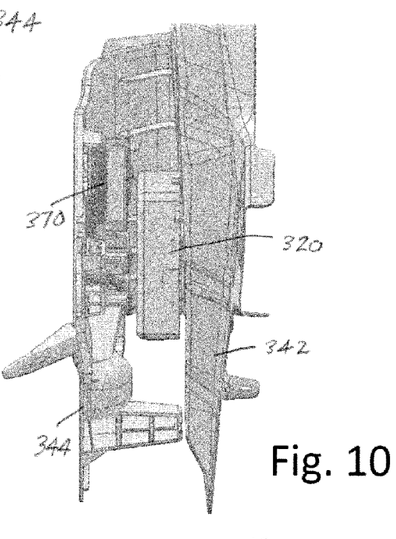
FIG. 10 is a view taken generally from the right-hand end of FIG. 9.
Figure 11:
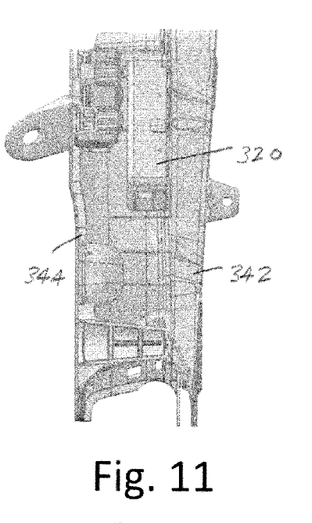
FIG. 11 is a view taken from the lower right-hand end of FIG. 9.
Figure 12:
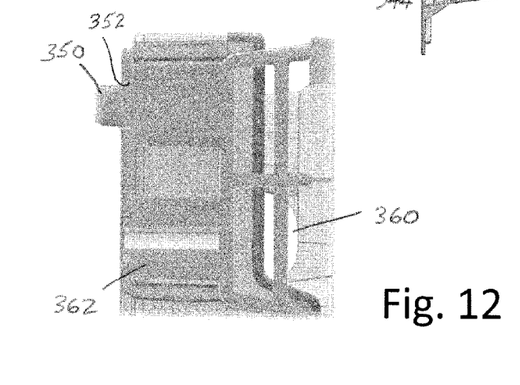
FIG. 12 is an enlarged view taken generally along the lines 12-12 of FIG. 13.
Figure 13:
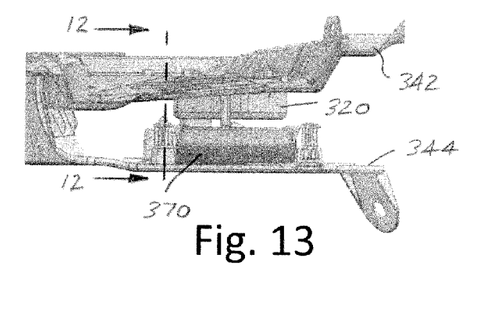
FIG. 13 is a view taken generally from the top of FIG. 9.
Figure 14:
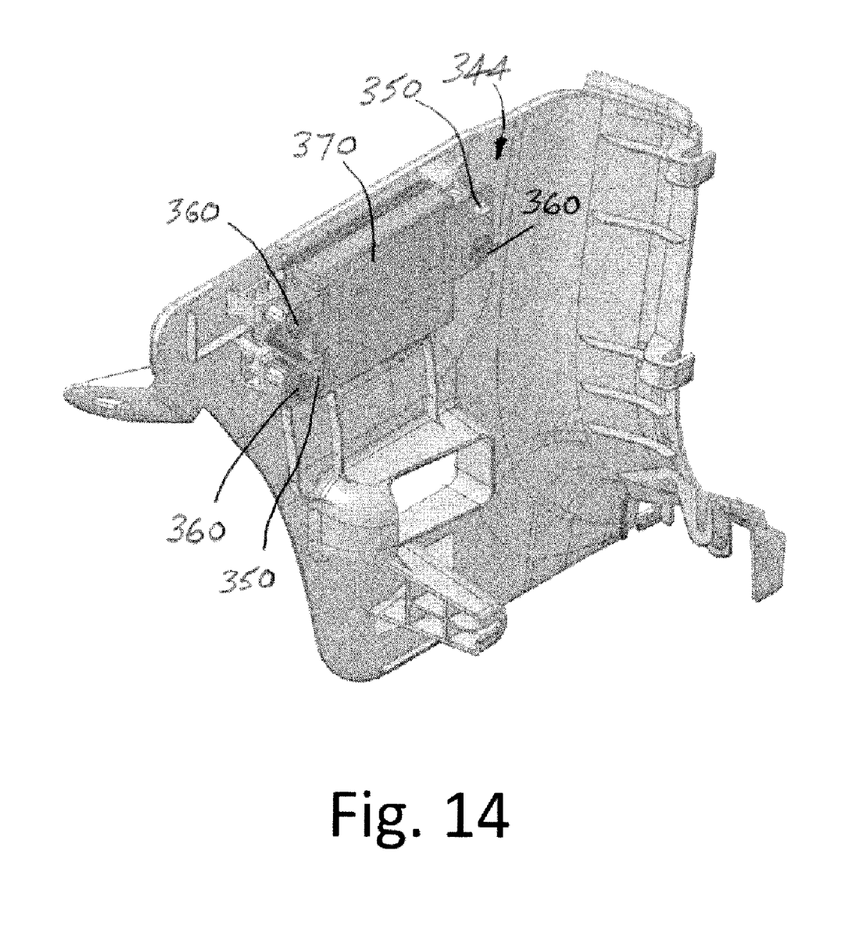
FIG. 14 is a view of an inner surface of the driver cowl lining illustrating another mounting arrangement of the electrical unit.

Two locations 230, 232 are generally represented in FIG. 3, and as will be appreciated, are associated with either a left-hand or a right-hand location of the steering wheel, and the instrument panel 202. Mounting the electrical unit 220 to the instrument panel foundation could unfortunately lead to sink marks on a customer-visible surface of the instrument panel. Therefore, a more desirable location is a cover, or more particularly referred to as an undercover 240. More particularly, a preferred mounting assembly for advantageously securing the electrical unit 220 to the cover 240 is shown in FIGS. 4-7. Preferably, an alignment member or pin 250 extends from the cover and is received through an opening 252 formed in a mounting tab 254 of the electrical unit (FIG. 7). As perhaps best illustrated in FIGS. 5 and 6, three mounting tabs 254 extend from spaced perimeter locations of the housing in the exemplary embodiment. At least one of the mounting tabs 254 includes the opening 252 as particularly illustrated in FIG. 7 to receive an associated alignment pin 250, although additional means for orienting the electrical unit 220 relative to the undercover 240 such as the alignment pin and opening may be provided, e.g., locating shoulders or positioning surfaces. The alignment pin and associated opening allow for a quick, easy orientation of the electrical unit 220 relative to the undercover 240. Subsequently, at least one (and preferably first, second and third) reusable threaded fastener or screw 260 extends through each mounting tab 254. The heads of the screws clamp the electrical unit 220 against respective bosses 262. The alignment pins are employed to initially position the electrical unit on the undercover and thereby maintain the electrical unit in position while the screws are installed to finally secure the unit 220 to the undercover 240. Thus, three screw bosses 262 and two alignment pins 250 extend from the undercover in the exemplary embodiment. Preferably the bosses and undercover are stiffened with ribs, for example, to provide sufficient rigidity to meet the electrical unit specifications. Further, the electrical unit 220 can be encased in plastic instead of metal thereby contributing to reduced vehicle weight. Use of reusable fastener screws allows selective removal of the electrical unit during servicing, i.e., the screws are reversible fasteners, without damaging the instrument panel cover.

Turning now to FIGS. 8-14, there is shown a second exemplary embodiment for mounting an electrical unit adjacent a remote control mirror switch. More particularly, dashboard 300 includes an instrument panel 302 adjacent the steering wheel, again shown here on the left-hand side of the vehicle in FIG. 8. The remote control mirror switch 310 is mounted on the instrument panel 302, and the switch 310 remotely controls movement of the side-view mirrors (not shown) as described above. Electrical unit 320 is preferably located in one of two locations 330, 332 as represented by broken line regions in FIG. 8. As will be appreciated, these locations will be more specifically referred to as the cowl lining area and if the steering wheel is located on the left-hand side, then the drive cowl lining area will be at cover location 330, whereas if the steering wheel is located on the right, then the cowl lining area will be at cover location 332.

As more particularly evident in FIGS. 9-13, the cowl lining area includes an interior lining 342 and a drive cowl lining 344 disposed in covering relation. Typically, these separate components are secured together, for example, through use of snap-fit connections. The electrical unit 320 is secured to the interior lining 342 in this embodiment while in FIG. 14 the electrical unit is secured to an interior surface of the driver cowl lining 344. In either arrangement, the mounting assembly for the electrical unit 320 secures the electrical unit to the cover or driver cowl lining area 340. As perhaps best illustrated in FIGS. 12 and 14, alignment pins 350 extend from either the interior lining 342 or the driver cowl lining 344 for receipt through an opening 352 in an associated mounting tab 354 of the electrical unit. Preferably, a pair of alignment pins is used to provide for easy, precise location of the electrical unit 320 relative to the cover 340. The pins 350 are dimensioned to axially extend through the opening and temporarily position the electrical unit housing until reusable fasteners, such as threaded screws 360, are secured through the mounting tabs of the electrical unit and into associated threaded bosses 362 of the cowl lining area 340.

A second electrical unit 370 is shown in FIGS. 9-13 and is secured in the cowl lining area in the same manner, although shown here as being secured to the inner surface of the drive cowl lining 344, while the first electrical unit 320 is secured to the interior lining 342. That is, the concept of using the alignment pins 350 and lighter-weight fastener screws 360 for mounting the electrical unit to the cowl lining area is effective at reducing vehicle weight and cost.

The disclosure has been described with reference to preferred embodiments. Obviously, modifications and alterations will occur to others upon reading and understanding the preceding detailed description. It is intended that the disclosure be construed as including all such modifications and alterations.

We claim:

1. An electrical unit mounting assembly secured to an automotive panel comprising:
   an electrical unit including a memory member for storing data regarding a mirror position;
   a cover configured for operative engagement with the associated panel; and
   the electrical unit mounted to the cover with at least one alignment member and at least one reusable threaded fastener.

2. The electrical unit mounting assembly of claim 1 further including second and third reusable threaded fasteners disposed in spaced locations relative to the at least one reusable fasteners.

3. The electrical unit mounting assembly of claim 1 wherein the alignment member extends from the cover for receipt in an alignment opening in the electrical unit.

4. The electrical unit mounting assembly of claim 1 wherein the cover further includes at least one boss for receiving the at least one reusable threaded fastener.

5. The electrical unit mounting assembly of claim 4 wherein the cover further includes second and third bosses disposed in spaced locations for receiving respective second and third reusable threaded fasteners.

6. The electric unit mounting assembly of claim 1 wherein the electrical unit includes a housing having a mounting tab extending from a perimeter portion thereof, the mounting tab including an opening dimensioned to receive an alignment pin therethrough for properly orienting the electrical unit relative to the cover.

7. The electrical unit mounting assembly of claim 6 further comprising second and third mounting tabs extending from spaced perimeter locations on the housing.

8. The electrical unit mounting assembly of claim 1 wherein the electrical unit is mounted adjacent a remote control mirror switch located on the instrument panel.

9. The electrical unit mounting assembly of claim 1 wherein the cover is an undercover that mounts to an instrument panel of the automotive vehicle.

10. The electrical unit mounting assembly of claim 1 wherein the cover is a side cowl lining area.

11. The electrical unit mounting assembly of claim 1 wherein the associated panel is a vehicle dashboard having a remote control mirror switch in operative communication with the memory member that store data regarding the mirror.

12. The electrical unit mounting assembly of claim 11 wherein the cover is an undercover of the vehicle dashboard and the electrical unit is secured to the undercover.

13. The electrical unit mounting assembly of claim 12 wherein the undercover includes the at least one alignment member extending therefrom for engagement with an opening in the electrical unit.

14. The electrical unit mounting assembly of claim 13 wherein the electrical unit includes multiple mounting tabs extending therefrom for securing the electrical unit to the undercover.

15. The electrical unit mounting assembly of claim 14 wherein one of the mounting tabs includes the opening that receives the at least one alignment member.

16. The electrical unit mounting assembly of claim 15 wherein the electrical unit has a generally rectangular conformation and mounting tabs extend outwardly from at least two sides thereof.

17. The electrical unit mounting assembly of claim 11 wherein the cover is a side cowl lining area.

18. The electrical unit mounting assembly of claim 17 wherein the side cowl lining area includes the at least one alignment member extending therefrom for engagement with an opening in the electrical unit.

19. The electrical unit mounting assembly of claim 18 wherein the electrical unit includes multiple mounting tabs extending therefrom for securing the electrical unit to the undercover.

20. The electrical unit mounting assembly of claim 19 wherein one of the mounting tabs includes the opening that receives the at least one alignment member.

* * * * *